June 27, 1939. D. R. LIMBERS 2,164,071
LEHR DRIVE FOR SHEET GLASS MACHINES
Filed Sept. 29, 1937   3 Sheets-Sheet 3
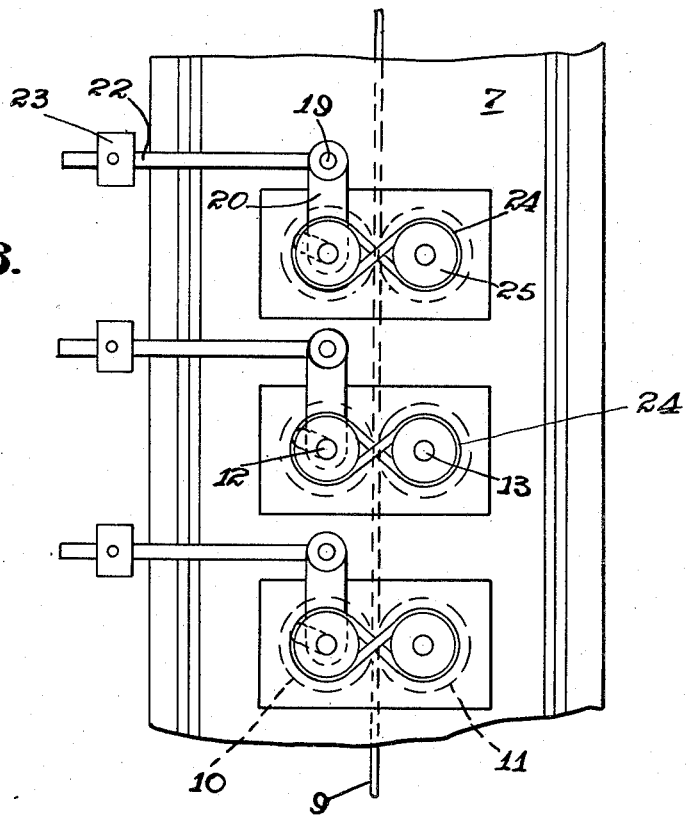
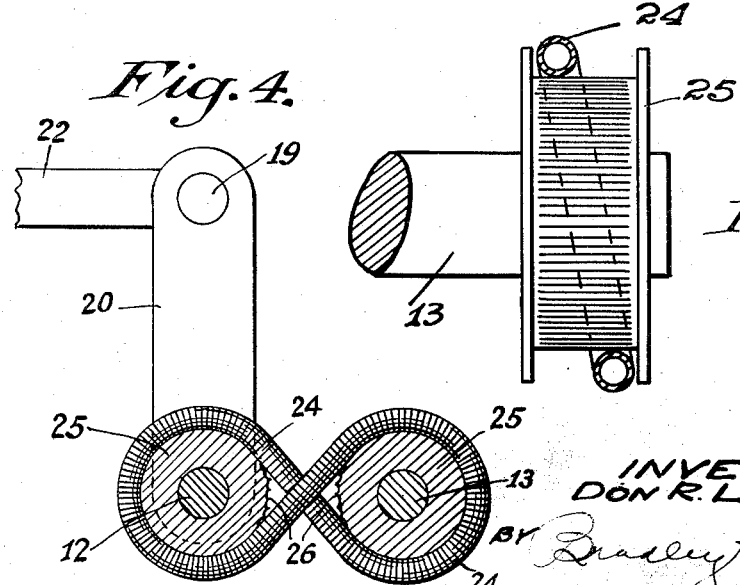
INVENTOR
DON R. LIMBERS
ATTORNEYS.

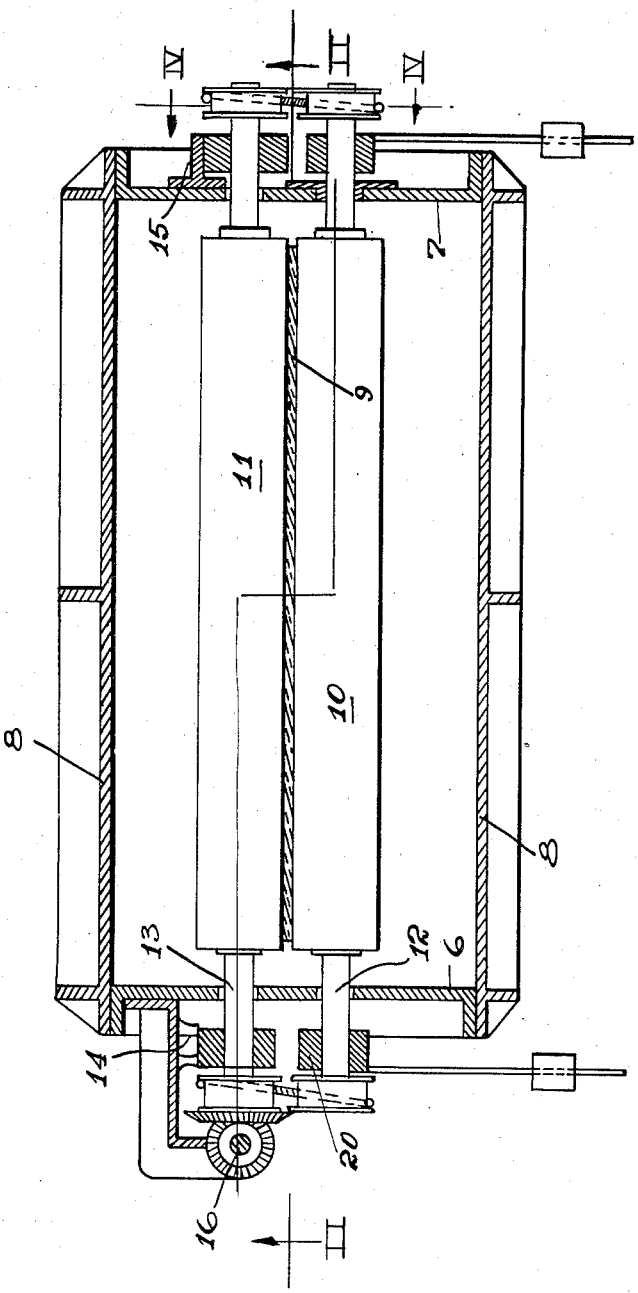

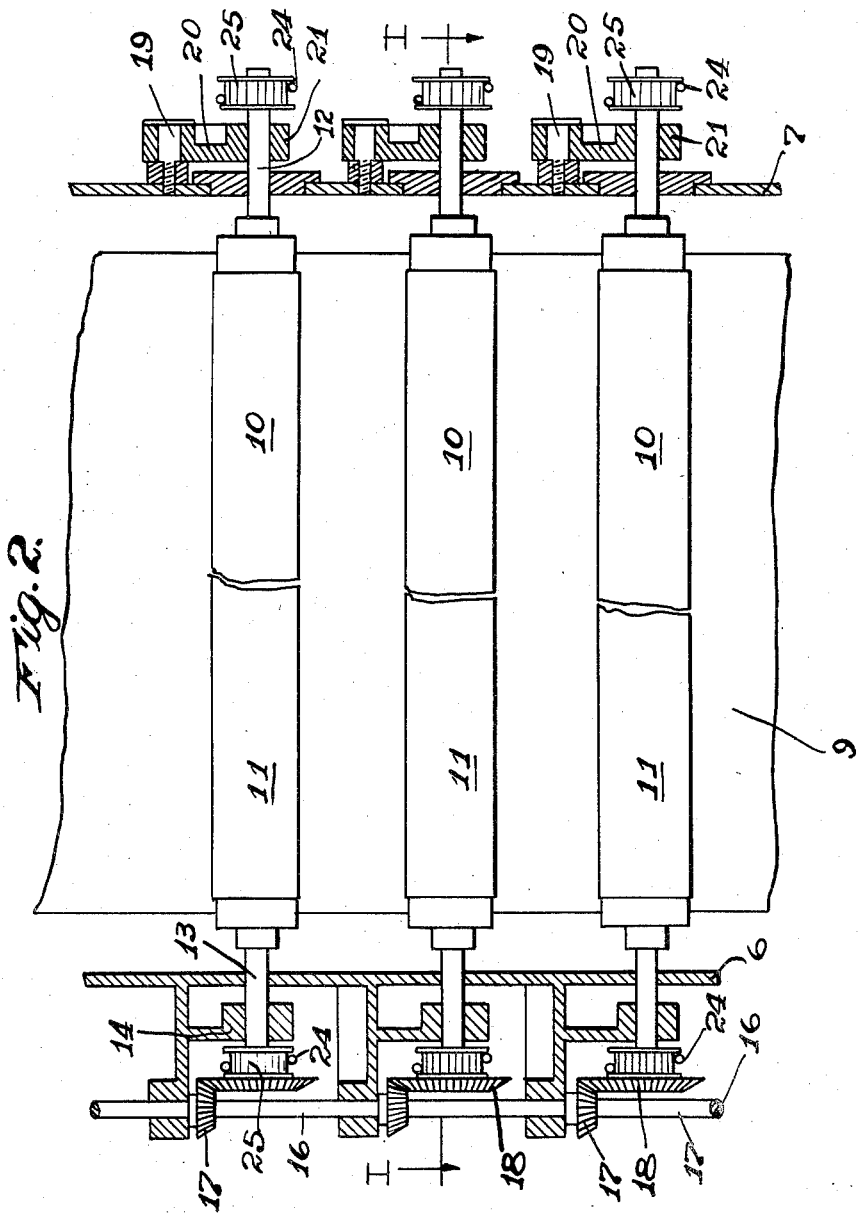

Patented June 27, 1939

2,164,071

UNITED STATES PATENT OFFICE 2,164,071

LEHR DRIVE FOR SHEET GLASS MACHINES

Don R. Limbers, Clarksburg, W. Va., assignor to Pittsburgh Plate Glass Company, Allegheny County, Pa., a corporation of Pennsylvania Application September 29, 1937, Serial No. 166,269

2 Claims. (Cl. 49—17)

The invention relates to a lehr drive for sheet glass machines, such as those employed in the Fourcault and Slingluff processes involving the use of a series of pairs of rolls in a vertical lehr casing which grip the glass sheet between the members of each pair and provide the traction necessary for drawing the sheet continuously from a bath of molten glass in a forehearth. The rolls on one side of the sheet are ordinarily mounted in fixed bearings, while the rolls on the other side are carried in movable bearings pressed inward by weighted levers, thus providing yielding pressure between the members of each pair of rolls and permitting the drawing of glass sheets of different thicknesses. It is customary to drive the fixed rolls from a vertical countershaft by the use of bevel gears on such shaft which engage similar gears carried on the shafts of the fixed rolls.

The present invention relates to an improved means for driving the movable rolls from the fixed rolls and has for one of its objects the provision of a cheap, simple means for accomplishing this result without lost motion in the drive so that each movable roll is driven uniformly at the same speed as the opposing fixed roll regardless of its position of adjustment with respect thereto. A further object is the provision of means for driving the movable rolls from the fixed rolls adapted to yieldingly force the movable rolls toward the fixed rolls, thus reducing the size of the weights required in connection with each movable roll in order to give the necessary tractive pressure on the glass sheet. One embodiment of the invention is illustrated in the accompanying drawings, wherein:

Figure 1 is a horizontal section through the apparatus on the line I—I of Fig. 2. Fig. 2 is a vertical section on the line II—II of Fig. 1 showing half of the apparatus in one plane and the other half in another plane. Fig. 3 is an end elevation. Fig. 4 is an enlarged detail section on the line IV—IV of Fig. 1. And Fig. 5 is a detail elevation view.

Referring to the drawings, 6 and 7 are the side walls of a vertical lehr casing, and 8, 8 are the front and rear walls thereof, the glass sheet 9 being drawn continuously through the lehr and cut off in sections at the upper end in a manner well known in the art.

The drawing force is applied to the sheet by means of the pairs of rolls 10 and 11 mounted on the shafts 12 and 13 and formed of the usual asbestos composition in order to stand the heat and avoid marring the glass. The rear rolls 11 are mounted in fixed bearings 14 and 15 secured to the lehr casing and are driven from the vertical line shaft 16 through the intermediary of the pairs of gears 17 and 18 fixed respectively on the line shaft and on the ends of the shafts 13. The shaft 16 is driven from a motor preferably located at the upper end of the lehr casing and not shown.

The front rolls 10 are mounted for movement toward and from the rolls 11 and for this purpose are supported at each end on weighted bell crank levers which are pivoted to the casing at 19. The vertical arms 20 of the levers are provided with bearings 21, in which the shafts 12 are journalled and the horizontal arms 22 carry the weights 23. This provides a means for causing the rolls 10 to press yieldingly toward the rolls 11 for giving the necessary pressure upon the glass sheet. The weights 23 are adjustable on the arms 22 so as to regulate this pressure.

The drive of the movable rolls 10 from the fixed rolls 11 is accomplished by means of the cross belts 24 at each end of each pair of rolls, such belts passing around suitable pulley wheels 25 keyed to the shafts of the rolls 10 and 11. The belts are in the form of coil springs, as indicated most clearly in Fig. 5, which are under tension, and in order to prevent slippage on the pulley wheels, such wheels are transversely serrated, as indicated at 26 in Figs. 4 and 5. By this means, positive drive of the movable rolls from the fixed rolls is secured under varying conditions of adjustment of the movable rolls. The movable rolls are driven at the same speed as the fixed rolls and there is no unevenness in the drive tending to cause slippage or breakage. The spring belts perform the further function of increasing the pressure between the fixed and movable rolls so that the weights 23 on the bell crank levers may be made smaller and lighter than has heretofore been the practice, their principal function being as adjustment means, due to the possibility of moving the weights along the lever arms. Any unevenness of pressure of the rolls upon the glass incident to the inertia of the weights (which in service vibrate considerably) is reduced to a minimum. The advantage of this drive for the movable rolls, as compared with others heretofore used, will be readily apparent to those skilled in the art.

What I claim is:

1. In combination in a vertical lehr for drawing and annealing a glass sheet, a pair of opposing horizontal drawing rolls adapted to grip the glass sheet therebetween, one of which is mounted in fixed bearings, and the other mounted for movement toward and from the fixed roll, adjustable weighted means at each end of the movable roll tending to move such roll toward the fixed roll, a pulley wheel on each end of the fixed roll, a pulley wheel on each end of the movable roll, and a cross belt in the form of a spiral spring under tension at each end of the pair of rolls passing around the pulley wheel on the end of the fixed roll and the pulley wheel on the end of the movable roll, and serving to increase the pressure between the rolls.

2. In combination in a vertical lehr for drawing and annealing a glass sheet, a pair of opposing horizontal drawing rolls adapted to grip the glass sheet therebetween, one of which is mounted in fixed bearings, and the other mounted for movement toward and from the fixed roll, adjustable weighted means at each end of the movable roll tending to move such roll toward the fixed roll, a pulley wheel on each end of the fixed roll, a pulley wheel on each end of the movable roll, and a cross belt in the form of a spiral spring under tension at each end of the pair of rolls passing around the pulley wheel on the end of the fixed roll and the pulley wheel on the end of the movable roll, and serving to increase the pressure between the rolls, the belt engaging faces of the wheels being serrated transversely of the plane of rotation of the wheels to receive the coils of the springs forming the belts and increase the traction between the wheels and the belts.

DON R. LIMBERS.